United States Patent

Whitman et al.

[11] Patent Number: 5,578,892
[45] Date of Patent: Nov. 26, 1996

[54] BUG FREE LINEAR QUARTZ HALOGEN LAMP

[75] Inventors: Pamela K. Whitman; Thomas G. Parham, both of Gates Mills, Ohio

[73] Assignee: General Electric Company, Schenectady, N.Y.

[21] Appl. No.: 403,045

[22] Filed: Mar. 13, 1995

[51] Int. Cl.$^6$ .................................................. H01K 1/32
[52] U.S. Cl. ............................ 313/112; 313/116; 313/635
[58] Field of Search ..................................... 313/110, 112, 313/635, 489, 116; 106/712, 436

[56] References Cited

U.S. PATENT DOCUMENTS

| | | | |
|---|---|---|---|
| 4,171,227 | 10/1979 | Derolf et al. | 106/712 X |
| 4,633,127 | 12/1986 | Beurskens et al. | |
| 5,107,167 | 4/1992 | Shobert et al. | 313/112 |
| 5,118,985 | 6/1992 | Patton et al. | |
| 5,177,385 | 1/1993 | Reisman | 313/112 |

*Primary Examiner*—Nimeshkumar Patel
*Attorney, Agent, or Firm*—George E. Hawranko

[57] ABSTRACT

An electric lamp is provided having a quartz envelope and a light source capable of generating light within the envelope. Disposed on a surface of the envelope is a filter which absorbs a portion of the light emitted by the light source to produce light output poorly seen by insects. The filter includes a blue absorbing pigment in a vitreous glassy silica binder derived from a coating precursor comprising a liquid dispersion of colloidal silica in a silicone. The blue absorbing pigment is preferably a praseodymium doped zircon or an antimony doped nickel titanate. Preferably, the filter also includes a precoat of ultra-fine titania to improve the reduction of ultraviolet radiation.

22 Claims, 3 Drawing Sheets

5,578,892

BUG FREE LINEAR QUARTZ HALOGEN LAMP

BACKGROUND OF THE INVENTION

1. Field of the Invention

The present invention generally relates to electric lamps, and more particularly, to electric lamps having an improved filter for decreasing the attractiveness of the lamp to night insects.

2. Description of Related Art

Lamps used in applications where it is undesirable for light to attract insects, commonly referred to as "bug lights" or "bug lamps", typically have a colored filter or pigment that blocks a portion of the radiation emitted by the lamp that is most visible to night insects. The filter generally absorbs or attenuates radiation having a wavelength of about 450 nanometers or less, which includes ultraviolet and blue portions of the spectrum of light emitted by the lamp. An acceptable level of light visible to humans, which are more sensitive to wavelengths in the yellow portion of the spectrum than the ultraviolet and blue portions of the spectrum, is maintained because radiation having a wavelength greater than about 450 nanometers is substantially unaffected or transmitted through the filter.

Prior art bug lamps have typically utilized various cadmium sulfide (CdS) pigments to provide decorative and functional "yellow" bug lamps. For example, U.S. Pat. No. 3,320,460, the disclosure of which is expressly incorporated herein in its entirety, discloses a electrostatically applied coating of light-scattering pigmented powder including a cadmium compound. While the CdS pigments are very effective, cadmium is considered a hazardous material. Therefore, non-Cd pigments have more recently been used even though they are generally less effective at blocking the undesired portions of the spectrum of radiation emitted by the lamp. Examples of non-Cd pigments include Sb doped rutile pigment as a diffuse coating on the inside of a lamp envelope and an organic dye in a silicone coating. Another example of a non-Cd pigment is a diffuse coating of a fine-ground blend of praseodymium doped zircon (Zr:Pr) and silica electrostatically applied to the inside of a lamp envelope such as disclosed in U.S. Pat. No. 5,107,167, the disclosure of which is expressly incorporated herein in its entirety. A further example of a non-Cd pigment is a luminescent phosphor coating such as yttrium aluminum garnet doped with cerium (YAG:Ce) applied to the inside of a lamp envelope such as disclosed in U.S. Pat. No. 5,118,985, the disclosure of which is expressly incorporated herein in its entirety.

Lamps having a relatively high operating temperature, such as for example linear quartz halogen lamps and metal halide lamps, are widely used for exterior lighting. The prior art pigments or coatings, however, cannot be used on such high temperature lamps. The prior art coatings do not have coefficients of thermal expansion closely matching quartz or other materials used on high temperature lamp jackets and therefore are not compatible. Additionally, the prior art coatings are applied to the inside of the lamp envelope and thus would effect the chemistry of lamps such as quartz halogen and metal halide. Furthermore, the prior art coatings do not have the abrasion resistance or durability to be applied to the exterior of the lamp. Accordingly, there is a need for a coating or filter that has desired optical absorption characteristics, has high temperature stability, has the ability to withstand the temperature conditions and thermal cycling experienced over a typical operating life of the lamps, has a binder system compatible with quartz, that can be applied to the outside of the lamp, and that is relatively inexpensive to apply.

SUMMARY OF THE INVENTION

The present invention relates to an electric bug lamp having a filter that overcomes the above-described problems of the related art. According to the invention, the electric bug lamp includes a vitreous light transmissive envelope and a light source capable of generating light within the envelope. The filter is disposed on a surface of the envelope and includes a pigment for absorbing the blue portion and ultra-fine titania for absorbing the ultraviolet portion of the light generated within the envelope. Preferably, the filter includes a glassy silica binder derived from a coating precursor including a liquid dispersion of colloidal silica in a silicone.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figures 1A, 1B:
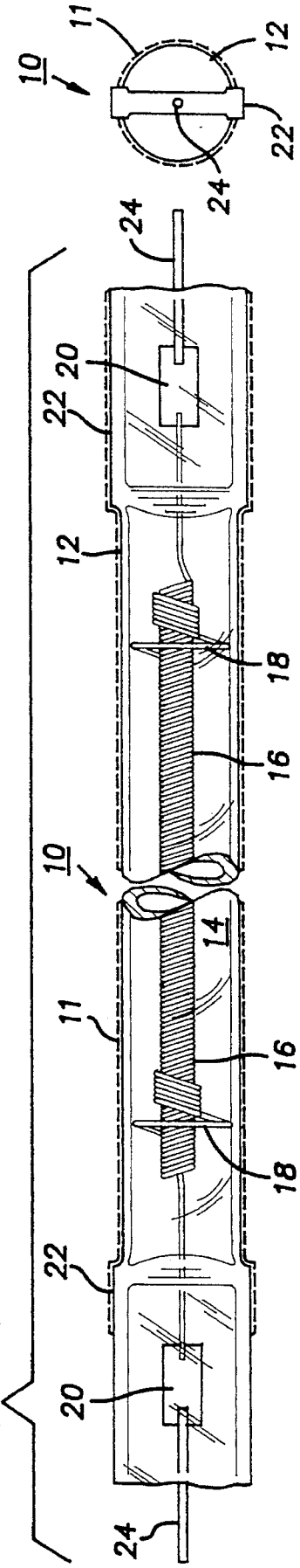
FIG. 1(a) is a side elevational view of a linear quartz halogen lamp having an envelope with a filter according to the present invention disposed thereon.
FIG. 1(b) is an end elevational view of the linear quartz halogen lamp of FIG. 1(a)

In FIGS. 1(a) and 1(b) there is schematically illustrated an incandescent linear quartz halogen lamp 10 having a coating or filter 11 for modifying a spectrum or color of light output. The lamp 10 includes a light transmissive envelope 12 which is typically a vitreous material such as quartz or fused silica. The envelope 12 includes a central portion defining a sealed chamber 14 and a press seal portion 22 at each end of the central portion. Hermetically sealed within the chamber 14 is a halogen fill typically comprising krypton and methyl bromide. A coiled tungsten filament 16 is horizontally disposed within the chamber 14 such that a longitudinal axis of the filament 16 is coincident with a longitudinal axis of the chamber 14. The filament 16 is supported within the chamber 14 by means of a plurality of tungsten or tantalum coiled wire filament supports 18. Each end of the filament 16 is welded or brazed to an end of an associated molybdenum foil seal 20. The foil seals 20 are hermetically sealed in the press seal portions 22 of the envelope 12. Lead wires 24 are attached to an end to the foil seals 20 opposite the filament 16 and outwardly extend from ends of the envelope 12.

The filter 11 of the illustrated embodiment is disposed on a substantial portion of the exterior surface of the envelope 12. It is noted that the filter 11 is only required to be adjacent a substantial portion of the sealed chamber 14 of the envelope 12. As used in this specification and claims, "disposed on" contemplates that the filter 11 may be directly contacting the envelope 12 or that there may be intermediate films or coatings such as, for example, a precoat or primer.

Figure 2:
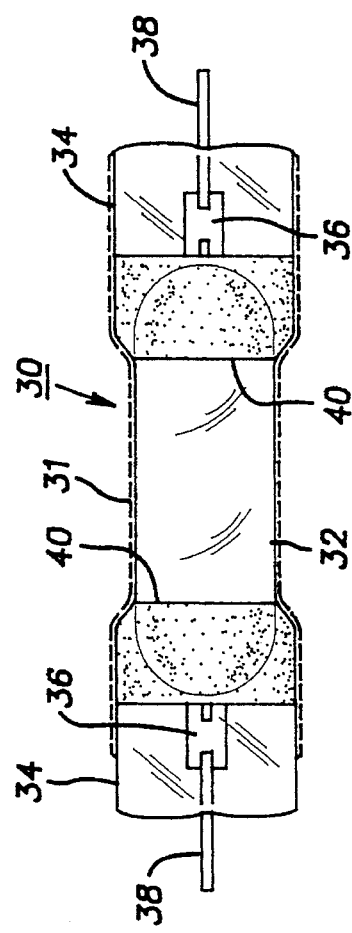
FIG. 2 is a side elevational view of an arc lamp having an arc tube with a filter according to the present invention.

Other lamps, lamp types, and lamp configurations can also be used in accordance with the invention. For example, FIG. 2 schematically illustrates an arc lamp 30 having a filter 31 for modifying a spectrum or color of light output according to the present invention. The arc lamp 30 includes a light-transmissive vitreous quartz envelope 32 having a central portion defining an arc chamber and a press seal portion 34 at each end of the central portion. Hermetically sealed within the arc chamber is a pair of spaced apart electrodes and an arc sustaining fill comprising one or more metal halides and mercury. It will be noted that the arc lamp could alternatively be an electrodeless arc lamp. Each of the electrodes are welded or brazed to an end of an associated molybdenum foil seal 36. The foil seals 36 are hermetically sealed in the press seal portions 34 of the envelope 32. Lead wires 38 are attached to an end to the foil seals 36 opposite the electrodes and outwardly extend from ends of the envelope 32.

A diffuse reflective coating 40 is disposed on a portion of an exterior surface of the envelope 32. Both ends of the arc chamber, at the transition from the central portion to the press seal portions 34 of the envelope 32, are covered by the diffuse reflective coating 40. The diffuse reflective coating 40 is a coating, such as a boron nitride, aluminum oxide, or zirconium oxide coating, that substantially reflects visible and infrared radiation portions of the light emitted by the arc. The reflected radiation or heat minimizes or avoids condensation of the metal halide at the ends of the arc chamber during operation of the arc lamp 30. It is noted that the diffuse reflective coating 40 could be disposed on other portions of the envelope 32 to direct or reflect radiation emitted by the arc in a desired direction and/or to minimize radiation from being emitted in an undesired direction.

The filter 31 of the illustrated embodiment is disposed on a substantial portion of the exterior surface of the envelope 32. However, as noted above for the linear quartz halogen lamp 10, the filter 31 is only required to be adjacent to a substantial portion of the arc chamber of the envelope 32. In other embodiments the filter 31 could be disposed on a light-transmissive outer envelope (such as a glass outer envelope) surrounding and spaced apart from the arc lamp 30, or a light-transmissive (such as a fused quartz shroud) surrounding and spaced apart from the arc lamp 30.

The filter comprises a blue absorbing pigment in a vitreous or glassy silica binder. The pigment may include any pigment having the desired spectral characteristics (obtaining a relatively low light output visible to night insects and a relatively high light output visible to humans), the desired coating appearance, and high temperature stability.

The desired spectral characteristics of the pigment are to absorb or block the ultraviolet and blue portions of the spectrum of light output from the lamp. Preferably, the pigment absorbs or blocks substantially all radiation having a wavelength of about 400 nanometers or less, and more preferably, absorbs or blocks substantially all radiation having a wavelength of about 450 nanometers or less.

The desired coating appearance is to look like a conventional incandescent bug lamp, that is, appear yellow in color when unlit. Therefore, a yellow pigment is preferred.

The pigment preferably is stable to the wall temperature of the lamp during operation. Linear quartz halogen lamps typically have a wall temperature of about 600 to about 800 degrees Centigrade (C) or more during operation. Depending on the lamp application the pigment is preferably a high temperature pigment which is stable to at least 500 degrees C., more preferably to at least 800 degrees C., and most preferably to at least 900 degrees C. Therefore, the pigment is preferably an inorganic pigment.

Illustrative, but non-limiting examples of suitable pigments include praseodymium doped zircon (ZrPr) and antimony doped nickel titanate (NiSbTi). A suitable pigment of ZrPr is Ferro 2434 obtained from Ferro Corp. of Cleveland, Ohio. A suitable pigment of NiSbTi is Ferro V9412 obtained from Ferro Corp. of Cleveland, Ohio.

It is noted that other pigments having other spectral characteristics may be useful to obtain lamps for other applications. For example, heat lamps having iron oxide to block visible wavelengths and transmit infrared wavelengths, stop/tail lights for automotive use producing a red or amber color, and indoor linear quartz lamps producing "designer" colors.

The binder for the filter must be compatible with the lamp envelope to provide good adherence of the filter to the lamp envelope. Therefore, the binder has a coefficient of thermal expansion that closely matches quartz. Preferably, the binder for the filter is a glassy silica which is derived from a coating precursor comprising a liquid dispersion of colloidal silica in a silicone. Silica is used here in a generic sense in that some silicates may also be present. Silicone is also used herein in its generic sense. Alternatively, the binder can be any glassy, vitreous, or amorphous silica ($SiO_2$). The glassy silica provides a solid, abrasion resistant, hard, transparent, water and acetone impervious coating that can withstand temperatures up to about 1000 degrees C.

Filters have been made wherein the silicone of the coating precursor is a water-alcohol solution of the partial condensate of $R(Si(OH)_3)$ wherein R is an alkane, such as methyl trimethoxy silane. Examples of suitable silicones of this type, including some which are disclosed as containing colloidal silica, are disclosed, for example, in U.S. Pat. Nos. 3,986,997, 4,275,118, 4,500,669 and 4,571,365, the disclosures of which are expressly incorporated herein by reference in their entirety. A suitable coating precursor is a silica hardcoat such as Silvue 313 Abrasion Resistant Coating obtained from SDC Coatings Inc., of Garden Grove, Calif. The Silvue 313 is a dispersion of colloidal silica in a solution of a partial condensate of $R(Si(OH)_3)$ wherein R is a methyl group. The dispersion contains 5% acetic acid, 13% n-butanol, 30% isopropanol, 1% methanol (all % by weight), and water. The total solids content of the colloidal silica and methyl trimethoxy silane ranges between 20-25% by weight.

To obtain a relatively thin filter, the coating precursor is diluted with solvents, such as n-butanol (butyl alcohol) and isopropanol (2-propanol). It is believed that other suitable alcohols can be used. Filters have been obtained with a coating precursor solution of 70 grams of n-butanol and 70 grams of isopropanol added to 60 grams of the Silvue 313. Finally, a pigment-silica sol gel suspension is obtained by adding 4 grams of the high temperature pigment to 25 grams of the coating precursor solution.

The pigment-silica sol gel suspension is preferably applied to the lamp by dipping the lamp into the suspension so that substantially all or most of the exterior surface of the lamp envelope is covered. The pigment-silica sol gel suspension can alternatively be applied to the lamp by other application methods such as, for example, spraying, pouring or brushing.

After the pigment-silica sol gel suspension has been applied to the lamp, it is dried at a low temperature to evaporate the solvents, that is, to drive off the hydrocarbons. The temperature must be high enough to drive off the hydrocarbons but low enough to prevent or minimize reaction of the silicone sol gel, and therefore, should be below 350 degrees C. and preferably below 150 degrees C. If the pigment-silica sol gel suspension is heated to an elevated temperature too rapidly the hydrocarbons will be trapped and turn to graphite which results in a darkening or blackening of the coating. Preferably, the pigment-silica sol gel suspension is air dried for about 20 to 30 minutes and then oven dried at 150 degrees C. for about 30 minutes.

After the pigment-silica sol gel suspension has been dried at a low temperature, the coating precursor is slowly heated in air to an elevated temperature to "cure" the coating, that is, to drive out or pyrolyze the organics and densify the silica by cross linking the silicone sol gel to form glassy silica. The elevated temperature must be high enough to react the silicone sol gel, and therefore, should be above 350 degrees C. The pigment-silica sol gel suspension can be heated to the elevated temperature by baking the lamp in an oven, such as at 350 degrees C. for about 30 minutes. When heating the lamp in the oven caution must be taken to ensure that components of the lamp, such as the molybdenum foil seals, are not damaged by the elevated temperature. Alternatively, and preferably, pigment-silica sol gel suspension is heated to the elevated temperature by energizing the lamp. The linear quartz halogen lamp, which typically has a wall temperature of about 600 C. to about 800 degrees C. during operation, is preferably energized for about 3 to about 5 minutes.

The filter should have a thickness that provides the desired spectral characteristics, desired coating appearance, and good adherence to the lamp envelope. Coating thickness can be varied by modifying the pigment concentration in the pigment-silica sol gel suspension. Significant variation in the pigment:coating precursor ratio, however, results in poorly adhering films or poor pigment coverage. Coating thickness can also be increased by dip coating the lamp multiple times.

Preferably, a precoat containing ultra-fine titania is applied to the lamp envelope to further enhance the spectral characteristics of the filter. The addition of the ultra-fine titania precoat improves the reduction of the ultraviolet portion of the radiation emitted by the lamp. The ultra-fine titania preferably has a particle size of 0.01 to about 0.75 microns, and more preferably, a particle size 0.01 to 0.05 microns. Note that this is not paint titania that typically has a particle size of about 0.2 to 0.5 microns. The particle size is small so little visible radiation scatter occurs while most ultraviolet radiation is absorbed (back scatter). Thus the ultraviolet radiation does not even reach the blue absorbing pigment. The increased absorption of the ultraviolet radiation allows a thinner filter to be applied resulting in a lower loss of the portion of the radiation visible to humans. It should be noted that the ultra-fine titania could alternatively be mixed with the blue absorbing pigment.

A precoat has been obtained with a precoat suspension of 90.6 grams of an ethanol solution (see below), 10.0 grams of an ultra-fine rutile titania powder, and 100 cc of zirconia milling media, ⅛ inch diameter. The mixture is rolled for 24 hours, filtered through a 300 mesh screen and diluted with an additional 85 grams of ethanol. A suitable ultra-fine rutile titania powder is L581 obtained from Kemira, Inc. of Savannah, Ga. The ethanol solution is obtained by combining of 703 grams of ethanol, 172 grams Union Carbide PropylMethylAcetate (PMA), and 31 grams boric acid, and milling for 3 hours with alumina pebbles to dissolve the boric acid.

The precoat suspension is preferably applied to the lamp by dipping the lamp into the precoat suspension so that substantially all or most of the exterior surface of the lamp envelope is covered. The precoat suspension can alternatively be applied to the lamp by other application methods such as, for example, spraying, pouring or brushing. After the precoat suspension has been applied to the lamp, it is dried at a low temperature to evaporate the solvents prior to applying the pigment-silica sol gel suspension. Preferably, the precoat suspension is air dried for about 20 to about 30 minutes.

EXAMPLE

An ethanol solution was prepared by combining 703 grams of ethanol, 172 grams of Union Carbide PMA, and 31 grams of boric acid. A precoat suspension was made by adding 10.0 grams of Kemira ultra-fine rutile titania powder to 90.6 grams of the ethanol solution, rolling as described above, and diluted with an additional 85 grams of ethanol. A General Electric 300 Watt linear quartz halogen lamp part no. Q300T3/CL/CCD was dipped into the precoat suspension and air dried at room temperature for about 20 to 30 minutes. The precoated lamp was then placed in a laboratory oven at 350 degrees C. for about 30 minutes to drive off the solvents. The lamp obtained a precoat weighing about 15 milligrams.

A coating precursor solution was made by adding 70 grams of n-butanol and 70 grams of isopropanol to 60 grams of Silvue 313. A pigment-silica solution was prepared by adding 4 grams of Ferro 2434 to 25 grams of the coating precursor solution. The precoated lamp was dipped into the pigment-silica sol gel solution and air dried at room temperature for about 20 to 30 minutes. The precoated/coated lamp was then placed in a laboratory oven at 350 degrees C. for about 30 minutes to drive off the solvents. The lamp was then dipped a second time into the pigment-silica sol gel solution and dried in the same manner. The lamp was then energized for about 3 to 5 minutes to drive off or pyrolyze the organic material and densify the silica to form glassy silica. The lamp obtained a coating weighing about 26 milligrams and continued to have an appearance of a good strong yellow color when unlit.

The spectrum of light output of the precoated/coated lamp was measured by a DARS/8 foot integrating sphere system. Corrected color temperature (CCT) emission spectra from 380 to 750 nanometers were measured. An uncoated 300 watt G.E. DEQ lamp, and a G.E. 100 watt incandescent bug lamp (A-Line BugLite), were similarly measured. Photopic or human lumens (Lumens Human) and photopic lumens per watt (LPW Human) were calculated to be as follows:

| Lamp | CCT | Lumens Human | LPW Human |
|---|---|---|---|
| Uncoated DEQ | 2865 K | 5173 | 17.2 |
| precoated/coated DEQ | 1980 K | 3478 | 11.5 |
| A-line BugLite | 2039 K | 1083 | 10.8 |

Figure 3:
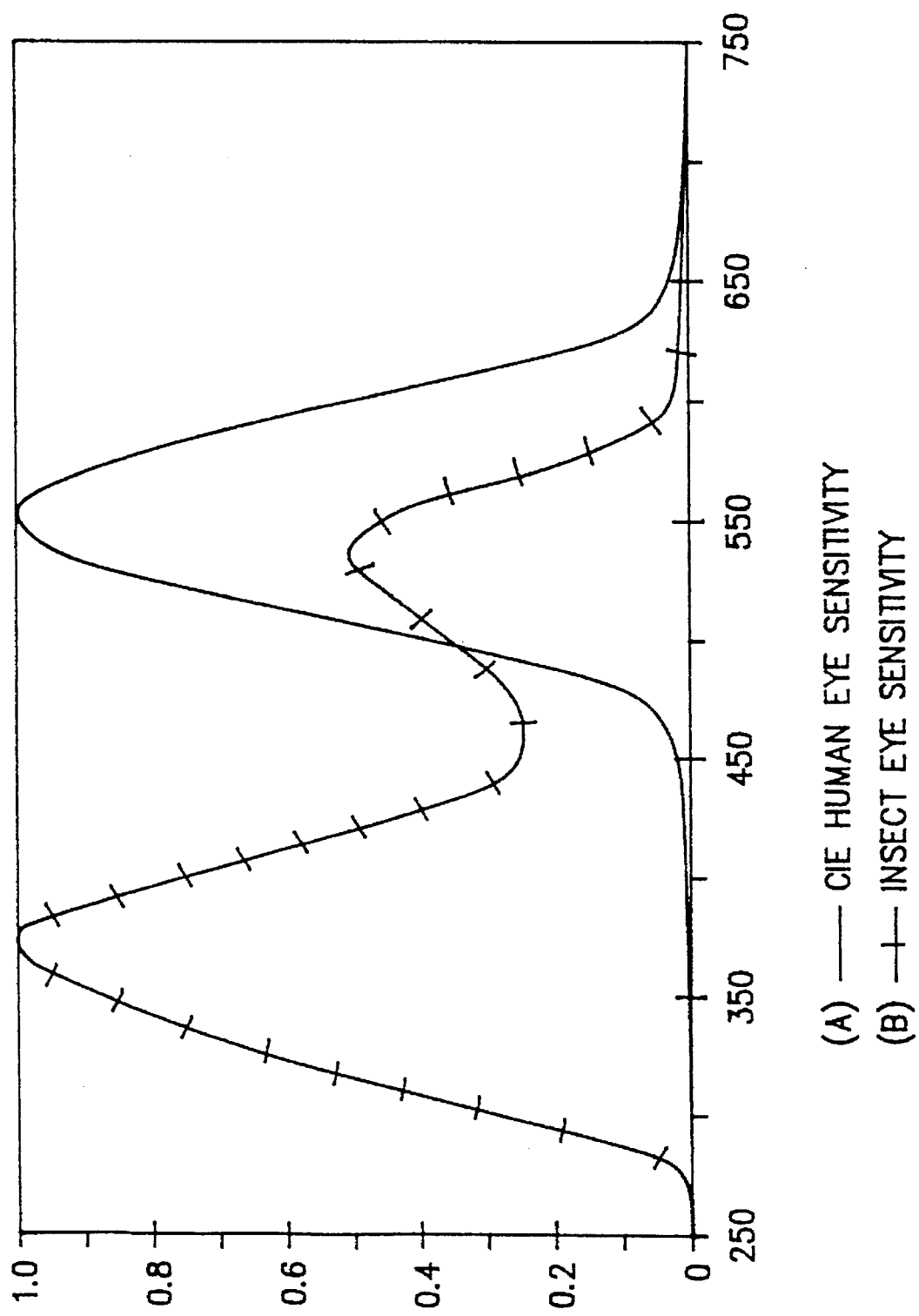
FIG. 3 is a graph showing human and insect eye sensitivity curves.

To compare the attractiveness of the various light sources to night insects, it is necessary to define a bug lumen analogous to the photopic lumen (human lumen). FIG. 3 illustrates an experimentally derived relative spectral optic sensitivity curve for night insects, comparable to the established human optic sensitivity curve (DIN 5031, V curve). By substituting this Insect Eye Sensitivity curve for the standard Human Eye Sensitivity curve, the bug lumens for the various light sources can be computed. For our calculations, the absolute maximum in the Insect Eye Sensitivity curve is given the arbitrary weighting of 1.00. The bug lumen is then calculated by integrating the product of the spectral emission of the lamp times the appropriate eye sensitivity weighting factor over the wavelengths from 280–800 nm.

Bug lumens (Lumens Bug), bug lumens per watt (LPW Bug), and a ratio of bug lumens to human lumens (BUG/Human) were calculated for each of the lamps to be as follows:

| Lamp | Lumens Bug | LPW Bug | Bug/Human |
| --- | --- | --- | --- |
| Uncoated DEQ | 2590 | 8.6 | 0.50 |
| precoated/coated DEQ | 1220 | 4.0 | 0.35 |
| A-line BugLite | 480 | 4.8 | 0.44 |

The precoated/coated lamp had a ratio of 0.35 compared to 0.50 for the uncoated lamp and 0.44 for the A-line BugLite. Therefore, the ratio of bug lumens to human lumens for the precoated/coated DEQ lamp is less than the existing incandescent bug lamp.

Figure 4:
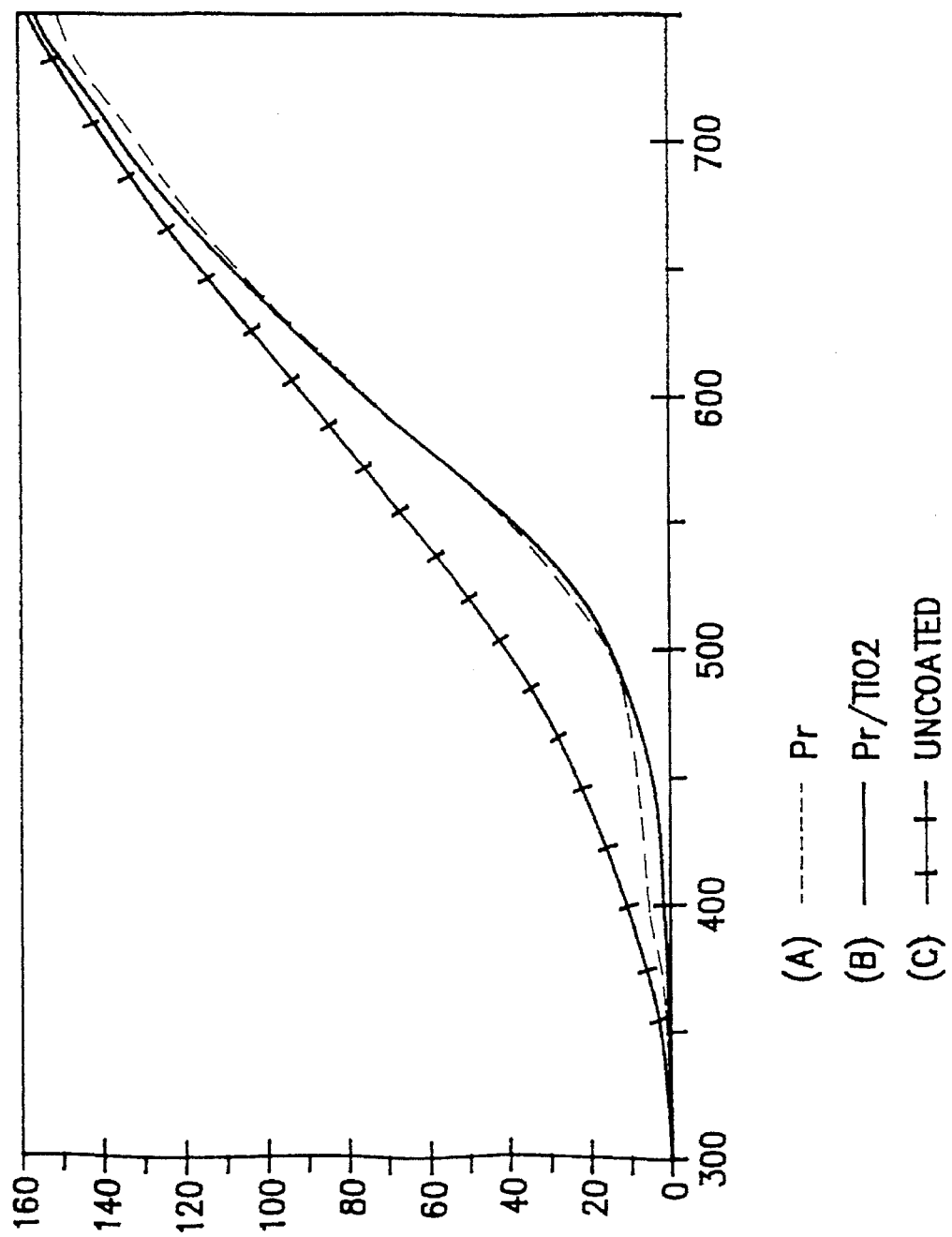
FIG. 4 is a graph showing light output as a function of wavelength for uncoated, coated, and precoated/coated 300 watt linear quartz halogen lamps.

FIG. 4 is a graph illustrating lamp emission as a function of wavelength for a 300 watt linear quartz lamp as described above for the precoated/coated DEQ lamp but without the precoat and with a relatively thick coating (curve A), the precoated/coated DEQ lamp (curve B), and the uncoated DEQ lamp (curve C). Comparing curves A and B with curve C, one can see the substantial reduction in ultraviolet and blue (280–450 nm) emission using the selected yellow pigment. Furthermore, comparing curves A and B, one can see the preferential reduction in ultraviolet emission which occurs, without substantially decreasing desirable visible emission (450–700 nm), when the precoat of ultra-fine titania is added.

Although particular embodiments of the invention have been disclosed in detail, it will be understood that the invention is not limited correspondingly in scope, but includes all changes and modifications coming within the spirit and terms of the claims appended hereto.

What is claimed is:

1. An electric bug lamp comprising:
   a vitreous light transmissive envelope;
   a light source capable of generating light within said envelope; and
   a filter disposed on a surface of said envelope comprising ultra-fine undoped titania having a particle size of 0.01 to 0.75 microns and a blue absorbing pigment.

2. The electric lamp according to claim 1, wherein said blue absorbing pigment is a material selected from the group consisting of praseodymium doped zircon and antimony doped nickel titanate.

3. The electric lamp according to claim 1, wherein said filter has at least first and second layers, said first layer including said ultra-fine titania and being located between said surface of said envelope and said second layer, and said second layer including said blue absorbing pigment in a continuous glassy silica matrix binder.

4. The electric lamp according to claim 3, wherein said silica matrix binder is derived from a coating precursor comprising a liquid dispersion of colloidal silica in a silicone, said binder having a coefficient of thermal expansion that closely matches that of quartz.

5. The electric lamp according to claim 1, wherein said ultra-fine titania and said pigment are in a continuous glassy silica matrix binder.

6. The electric lamp according to claim 5, wherein said silica matrix binder is derived from a coating precursor comprising a liquid dispersion of colloidal silica in a silicone, said binder having a coefficient of thermal expansion that closely matches that of quartz.

7. The electric lamp according to claim 1, wherein said filter absorbs substantially all of the light emitted by said light source having a wavelength of about 400 nanometers and below.

8. The electric lamp according to claim 1, wherein light transmitted through said envelope has a ratio of bug lumens to human lumens of about 0.44 or less.

9. The electric lamp according to claim 8, wherein said ratio is about 0.35 or less.

10. The electric lamp according to claim 1, wherein said lamp is a linear quartz halogen lamp.

11. The electric lamp according to claim 12, wherein said filter is disposed on an outer surface of said envelope and has at least first and second layers, said first layer including said ultra-fine titania and being located between said surface of said envelope and said second layer, and said second layer including said blue absorbing pigment in a continuous glassy silica matrix binder derived from a coating precursor comprising a liquid dispersion of colloidal silica in a silicone, said binder having a coefficient of thermal expansion that closely matches that of quartz.

12. A lamp according to claim 1, wherein said ultra-fine titania has a particle size of 0.01 to 0.05 microns.

13. A lamp according to claim 1, wherein said filter is disposed on an outer surface of said envelope.

14. An electric bug lamp comprising:
   a quartz envelope;
   a light source capable of generating light within said envelope; and
   a coating disposed on an outer surface of said envelope for absorbing at least a portion of said light emitted by said light source to modify a spectrum of light output of said lamp, said coating comprising a blue absorbing pigment in a continuous glassy silica matrix binder.

15. The electric lamp according to claim 14, wherein said silica matrix binder is derived from a coating precursor comprising a liquid dispersion of colloidal silica in a silicone, said binder having a coefficient of thermal expansion that closely matches that of quartz.

16. The electric lamp according to claim 15, wherein said coating can withstand temperatures of up to at least 500 degrees centigrade.

17. The electric lamp according to claim 16, wherein said coating can withstand temperatures of up to at least 900 degrees centigrade.

18. The electric lamp according to claim 17, wherein said lamp is a linear quartz halogen lamp.

19. The electric lamp according to claim 14, wherein said coating absorbs substantially all of the light emitted by said light source having a wavelength of about 400 nanometers and below.

20. The electric lamp according to claim 14, wherein said blue absorbing pigment is a material selected from the group consisting of praseodymium doped zircon and antimony doped nickel titanate.

21. The electric lamp according to claim 14, wherein said coating further comprises ultra-fine undoped titania having a particle size of 0.01 to 0.75 microns.

22. The electric lamp according to claim 14, further comprising a precoat comprising ultra-fine undoped titania having a particle size of 0.01 to 0.75 microns.

* * * * *